United States Patent
Zhang et al.

(10) Patent No.: US 11,252,310 B2
(45) Date of Patent: Feb. 15, 2022

(54) CAMERA MODULE, ELECTRONIC DEVICE AND PHOTOGRAPHING METHOD

(71) Applicant: BOE TECHNOLOGY GROUP CO., LTD., Beijing (CN)

(72) Inventors: Ying Zhang, Beijing (CN); Xitong Ma, Beijing (CN); Yifei Zhang, Beijing (CN); Kai Zhao, Beijing (CN); Yu Gu, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 775 days.

(21) Appl. No.: 15/743,338

(22) PCT Filed: Jul. 18, 2017

(86) PCT No.: PCT/CN2017/093302
§ 371 (c)(1),
(2) Date: Jan. 10, 2018

(87) PCT Pub. No.: WO2018/032926
PCT Pub. Date: Feb. 22, 2018

(65) Prior Publication Data
US 2020/0084348 A1    Mar. 12, 2020

(30) Foreign Application Priority Data

Aug. 19, 2016 (CN) .......................... 201610697299.X

(51) Int. Cl.
*G02B 7/10* (2021.01)
*H04N 5/225* (2006.01)

(52) U.S. Cl.
CPC ........... *H04N 5/2253* (2013.01); *G02B 7/102* (2013.01); *H04N 5/2254* (2013.01); *H04N 5/2257* (2013.01)

(58) Field of Classification Search
CPC . G02B 7/04; G02B 7/09; G02B 7/102; G02B 13/001; G02B 7/105; H04N 5/2253; H04N 5/2254; H04N 5/2257
See application file for complete search history.

(56) References Cited

U.S. PATENT DOCUMENTS 8,253,813 B2 * 8/2012 Ke .......................... G03B 5/00
                                                          348/208.2
2005/0264899 A1    12/2005 Manabe
(Continued)

FOREIGN PATENT DOCUMENTS

| CN | 1704789 A | 12/2005 |
| CN | 101571619 A | 11/2009 |

(Continued)

OTHER PUBLICATIONS

Search Report for International Application No. PCT/CN2017/093302 dated Sep. 12, 2017.

*Primary Examiner* — Christopher Stanford
*Assistant Examiner* — Journey F Sumlar
(74) *Attorney, Agent, or Firm* — Calfee, Halter & Griswold LLP

(57) ABSTRACT

A camera module, an electronic device and a photographing method are disclosed, which relates to the field of camera devices, in order to mitigate or alleviate the problem of an excessively small view angle for the existing camera module. The camera module includes a fixing member, a photographing unit connected with the fixing member via a connection shaft, a driving component including a first magnetic member and a first conductive member. Either of the first magnetic member and the first conductive member is fixed to the photographing unit, the other is fixed to the fixing member. The first conductive member is arranged to be located in a magnetic field of the first magnetic member so as to generate, when the first conductive member is (Continued)

energized, a driving force capable of driving the photographing unit to rotate around the connection shaft in the magnetic field of the first magnetic member.

16 Claims, 5 Drawing Sheets

(56) References Cited

U.S. PATENT DOCUMENTS

| | | |
|---|---|---|
| 2008/0058008 A1 | 3/2008 | Yoon |
| 2009/0268314 A1 | 10/2009 | Shih |
| 2010/0039719 A1* | 2/2010 | Park .................. G02B 7/023 |
| | | 359/824 |
| 2011/0176796 A1* | 7/2011 | Chiang ............. H04N 5/2259 |
| | | 396/336 |
| 2014/0313582 A1 | 10/2014 | Cheng et al. |
| 2015/0253583 A1* | 9/2015 | Cho .................. H04N 5/2257 |
| | | 348/360 |
| 2018/0017752 A1 | 1/2018 | Wei |

FOREIGN PATENT DOCUMENTS

| | | |
|---|---|---|
| CN | 202615020 U | 12/2012 |
| CN | 202904103 U | 4/2013 |
| CN | 103809263 A | 5/2014 |
| CN | 104267480 A | 1/2015 |
| CN | 104994261 A | 10/2015 |
| CN | 106161902 A | 11/2016 |
| CN | 205912147 U | 1/2017 |
| WO | 2014109475 A1 | 7/2014 |

* cited by examiner

CAMERA MODULE, ELECTRONIC DEVICE AND PHOTOGRAPHING METHOD

CROSS REFERENCE TO RELATED APPLICATIONS

The present application is the U.S. national phase entry of PCT/CN2017/093302, with an international filling date of Jul. 18, 2017, which claims the priority benefits of Chinese patent application No. 201610697299.X filed on Aug. 19, 2016, the disclosure of which is incorporated herein by reference.

TECHNICAL FIELD

This disclosure relates to the technical field of camera devices, and in particular to a camera module, an electronic device and a photographing method.

BACKGROUND

With the development of portable electronic devices such as mobile phones, photographing has become an indispensable function of the portable electronic devices, so a camera module has also become an indispensable part of the portable electronic device.

A view angle of the camera module depends on a lens assembly, but the lens assembly in the camera module in the prior art cannot be deflected during photographing, the magnitude of the view angle is always constant and thus the view angle of the camera module is excessively small.

SUMMARY

Embodiments of this disclosure provide a camera module, an electronic device and a photographing method, to mitigate or alleviate the problem of an excessively small view angle for the existing camera module.

An embodiment of this disclosure provides a camera module, comprising: a fixing member, a photographing unit connected with the fixing member via a connection shaft, a driving component comprising a first magnetic member and a first conductive member, either of the first magnetic member and the first conductive member being fixed to the photographing unit, and the other being fixed to the fixing member. The first conductive member is arranged to be located in a magnetic field of the first magnetic member so as to generate, in response to reception of electric power by the first conductive member, a driving force capable of driving the photographing unit to rotate around the connection shaft in the magnetic field of the first magnetic member.

In certain exemplary embodiments, the camera module comprises two first magnetic members, and the two first magnetic members are located on respective sides of an extension direction of the connection shaft, and the first conductive member is arranged in the magnetic field of each first magnetic member so as to generate, in response to reception of electric power by the first conductive member, driving forces for driving the photographing unit in opposite directions in the magnetic fields of the two first magnetic members respectively.

In certain exemplary embodiments, the first conductive member comprises a coil, the coil surrounding the photographing unit.

In certain exemplary embodiments, the first conductive member comprises multi-turn coils surrounding the photographing unit, and a portion of the multi-turn coils corresponding to the first magnetic member forms a first cambered surface protruding outwardly, and a surface of the first magnetic member facing the multi-turn coils is a second cambered surface, and a center of the second cambered surface coincides with that of the first cambered surface, and the center is located on an axis of the connection shaft, and a gap is left between the second cambered surface and the first cambered surface.

In certain exemplary embodiments, the camera module comprises a support member for at least supporting the portion of the multi-turn coils corresponding to the first magnetic member, a surface of the support member contacting the multi-turn coils is a third cambered surface protruding outwardly, and a center of the third cambered surface coincides with that of the second cambered surface.

In certain exemplary embodiments, the photographing unit comprises a first base for fixing an imaging sensor and a bracket for supporting a lens assembly, the bracket being connected with the first base via a first elastic member, and the photographing unit further comprises a second magnetic member above the first base and a second conductive member attached to the bracket, the second conductive member being arranged to be located in the magnetic field of the second magnetic member such that the second conductive member generates, in response to reception of electric power by the second conductive member, a driving force capable of driving the bracket to move in a direction toward or away from the first base. The second magnetic member is connected with a first yoke, the coil surrounding the first yoke.

In certain exemplary embodiments, the camera module further comprises a second elastic member, the second elastic member being used for connecting the first yoke with the first magnetic member or the fixing member.

In certain exemplary embodiments, the axis of the connection shaft passes through a geometric center of the photographing unit.

In certain exemplary embodiments, the second elastic member is a voice coil motor spring piece, and the voice coil motor spring piece comprises an outer ring and an inner ring, the outer ring being connected with the first elastic member or the fixing member, the inner ring comprising a first spring wire segment and a second spring wire segment connected with the first yoke, the first spring wire segment and the second spring wire segment are symmetrical with respect to the connection shaft, and each of the first spring wire segment and the second spring wire segment is connected with the outer ring at both ends thereof.

In certain exemplary embodiments, the first spring wire segment and the second spring wire segment both comprise a central region and end regions, the central region being connected with the first yoke, and the first yoke is provided with escape grooves in positions corresponding to the end regions.

In certain exemplary embodiments, the fixing member is a housing being provided with an opening, and the photographing unit and the driving component are both located inside the housing, and an optical path of the photographing unit passes through the opening.

In certain exemplary embodiments, the housing comprises a second yoke, and the first magnetic member is fixed to the second yoke.

In certain exemplary embodiments, the housing further comprises an upper cover and a second base connected with the second yoke, the opening being provided in the upper cover.

In certain exemplary embodiments, the connection shaft is a hinge shaft, and the photographing unit is hinged to the fixing member.

Another embodiment of this disclosure provides an electronic device, comprising the camera module according to any of the above embodiments.

In certain exemplary embodiments, the electronic device further comprises a controller, the controller being connected with the first conductive member and the photographing unit respectively, and the controller is configured for controlling a current flowing through the first conductive member and controlling the photographing unit to be switched on and off.

Yet another embodiment of this disclosure provides a method for photographing with the electronic device according to the above embodiments, comprising steps as follows:

by means of the controller, receiving a wide view angle photographing signal, and controlling the first conductive member to be supplied with a current in a first direction so as to generate in the magnetic field of the first magnetic member a driving force capable of driving the photographing unit to rotate around the connection shaft in a third direction;

controlling the photographing unit to be switched on and controlling the first conductive member to be supplied with a current in a second direction opposite to the first direction by the controller when the photographing unit rotates in the third direction to a first position, so as to generate in the magnetic field of the first magnetic member a driving force capable of driving the photographing unit to rotate around the connection shaft in a fourth direction, the fourth direction being opposite to the third direction;

controlling the photographing unit to be switched off and controlling the first conductive member to be supplied with the current in the first direction by the controller when the photographing unit rotates in the fourth direction to a second position, so as to generate in the magnetic field of the first magnetic member the driving force capable of driving the photographing unit to rotate around the connection shaft in the third direction; and controlling the first conductive member to be deenergized by the controller when the photographing unit rotates in the third direction to an original position.

Still another embodiment of this disclosure provides another method for photographing with an electronic device, a camera module of the electronic device comprising a second elastic member, the method comprising steps as follows:

receiving a wide view angle photographing signal and controlling the first conductive member to be supplied with a current in a first direction by a controller so as to generate in the magnetic field of the first magnetic member a first driving force capable of driving the photographing unit to rotate around the connection shaft in a third direction, wherein the rotation of the photographing unit in the third direction pulls an end of the second elastic member connected with the photographing unit such that the second elastic member deforms to generate an elastic force, controlling the photographing unit to be switched on and controlling the current in the first direction to gradually decrease by the controller when the elastic force is equal to the first driving force, such that the second elastic member gradually restores to an original shape, controlling by the controller the first conductive member to be supplied with a current in a second direction opposite to the first direction current when the second elastic member restores to the original shape, so as to generate in the magnetic field of the first magnetic member a second driving force capable of driving the photographing unit to rotate around the connection shaft in a fourth direction, the fourth direction being opposite to the third direction, wherein the rotation of the photographing unit in the fourth direction pulls an end of the second elastic member connected with the photographing unit such that the second elastic member deforms to generate an elastic force, and controlling the photographing unit to be switched off and controlling the first conductive member to be deenergized by the controller when the elastic force is equal to the second driving force.

In certain exemplary embodiments, the method further comprises steps of providing electric power to the second conductive member such that the second conductive member generates a driving force for driving the bracket to move in a direction toward or away from the first base.

DETAILED DESCRIPTION OF EMBODIMENTS

Figure 1:
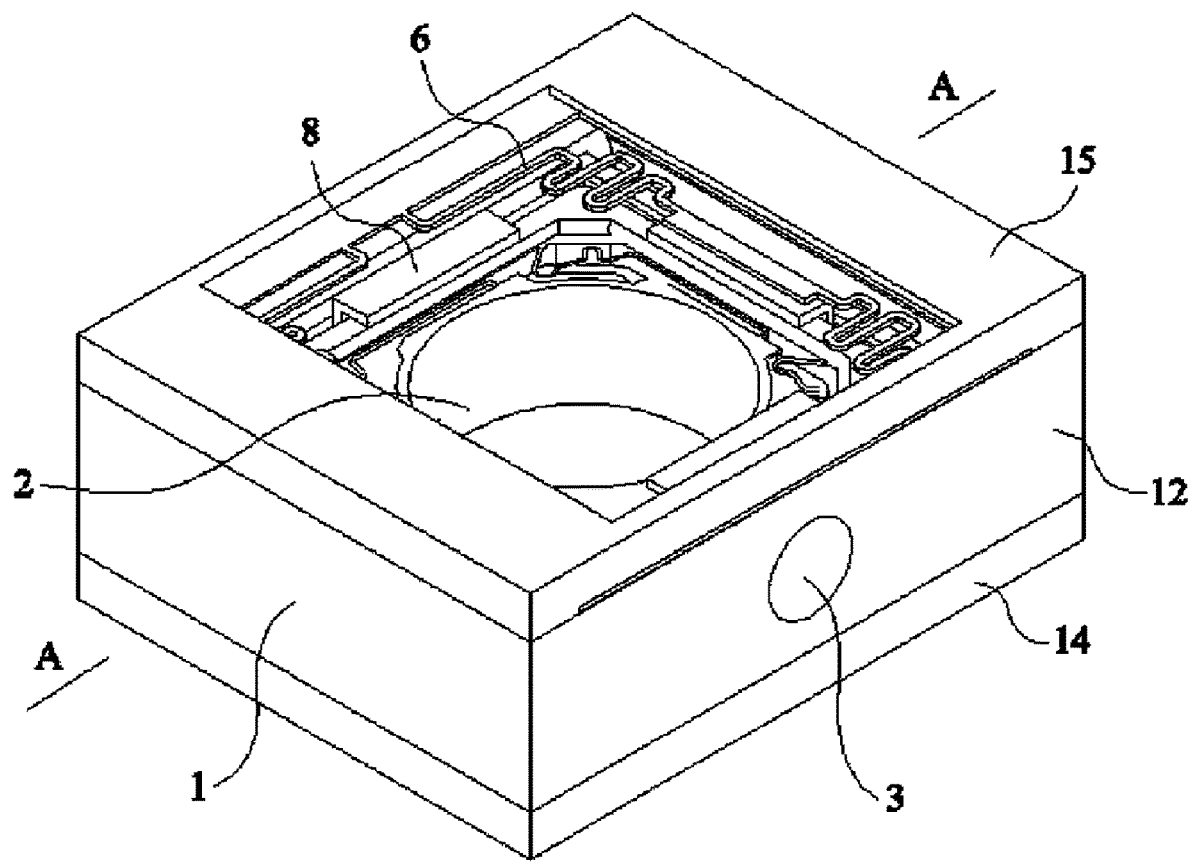
FIG. 1 is a schematic structure view of the camera module according to an embodiment of this disclosure.

The technical solutions in the embodiments of this disclosure shall be described clearly and completely as follows with reference to the drawings for the embodiments of this disclosure. The described embodiments are only part of the embodiments of the present invention, instead of all. Based on the embodiments in this disclosure, all other embodiments obtainable by a person having ordinary skills in the art without any inventive efforts shall fall within the protection scope of the invention.

In the description of this disclosure, it should be understood that directional or positional relations indicated by terms such as "center", "up", "down", "front", "back", "left", "right", "vertical", "horizontal", "top", "bottom", "inner" and "outer" are directional or positional relations shown on the basis of the drawings. They are only used for describing this disclosure and simplifying the description, instead of indicating or implying that the indicated devices or elements must be orientated specifically, or constructed and operated in a specific orientation, so they cannot be construed as limiting the invention.

Terms such as "first" and "second" are only used for descriptive purposes and should not be construed as indicating or implying relative importance or hinting at the number of the indicated technical features. Thereby, features defined by "first" and "second" can comprise one or more such features explicitly or implicitly.

In the description of this disclosure, it should be noted that terms of "install", "link" and "connect" should be understood in a broad sense unless otherwise prescribed and defined explicitly. For example, each of them may refer to fixed connection, or detachable connection, or integrated connection. They may also refer to direct connection, or indirect connection via intermediate media, or connection inside two elements. For a person having ordinary skills in the art, the specific meanings of the terms in this disclosure can be understood upon specific situations.

Referring to FIGS. 1-4, an embodiment of this disclosure provides a camera module, comprising: a fixing member 1, a photographing unit 2 connected with the fixing member 1 via a connection shaft 3, and a driving component 4 outside the photographing unit 2, the driving component 4 comprising a first magnetic member 41 and a first conductive member 42, either of the first magnetic member 41 and the first conductive member 42 being fixed to the photographing unit 2, and the other being fixed to the fixing member 1. The first conductive member 42 is arranged to be located in a magnetic field of the first magnetic member 41 so as to generate, when the first conductive member 42 is energized, a driving force capable of driving the photographing unit 2 to rotate around the connection shaft 3 in the magnetic field of the first magnetic member 41. With the rotation of the photographing unit 2 around the connection shaft 3, the optical path of the photographing unit 2 can be deflected.

For the camera module provided in the embodiment of this disclosure, the photographing unit 2 is connected with the fixing member 1 via the connection shaft 3, and the driving component 4 comprises the first magnetic member 41 and the first conductive member 42, either of the first magnetic member 41 and the first conductive member 42 being fixed to the photographing unit 2, and the other being fixed to the fixing member 1, and the first conductive member 42 is arranged to be located in the magnetic field of the first magnetic member 41, therefore, when the first conductive member 42 is energized, a driving force capable of driving the photographing unit 2 to rotate around the connection shaft 3 can be generated in the magnetic field of the first magnetic member 41. With the rotation of the photographing unit 2 around the connection shaft 3, the optical path of the photographing unit 2 can be deflected. That is, the lens assembly can be deflected, which increases the view angle of the camera module.

Besides, for the camera module provided in the embodiment of this disclosure, the photographing unit 2 can be directly driven to rotate around the connection shaft 3 with a driving force generated in the magnetic field of the first magnetic member 41 and acting on the first conductive member 42 or the first magnetic member 41, so no transmission mechanisms are required, which avoids the problem of a large volume of the camera module due to the space occupied by the transmission mechanisms, and meanwhile avoids the problem of high power consumption and low location accuracy for the camera module caused by frictions of the transmission mechanisms and low transmission accuracy thereof during the transmission.

It should be noted that the first magnetic member 41 can either be a magnet or an electromagnet, which will not be limited in this disclosure. In certain exemplary embodiments, the connection shaft for connecting the photographing unit 2 with the fixing member 1 can be a hinge shaft, and the photographing unit is hinged to the fixing member in this case, which can increase the flexibility between the photographing unit 2 and the fixing unit 1.

Figure 3:
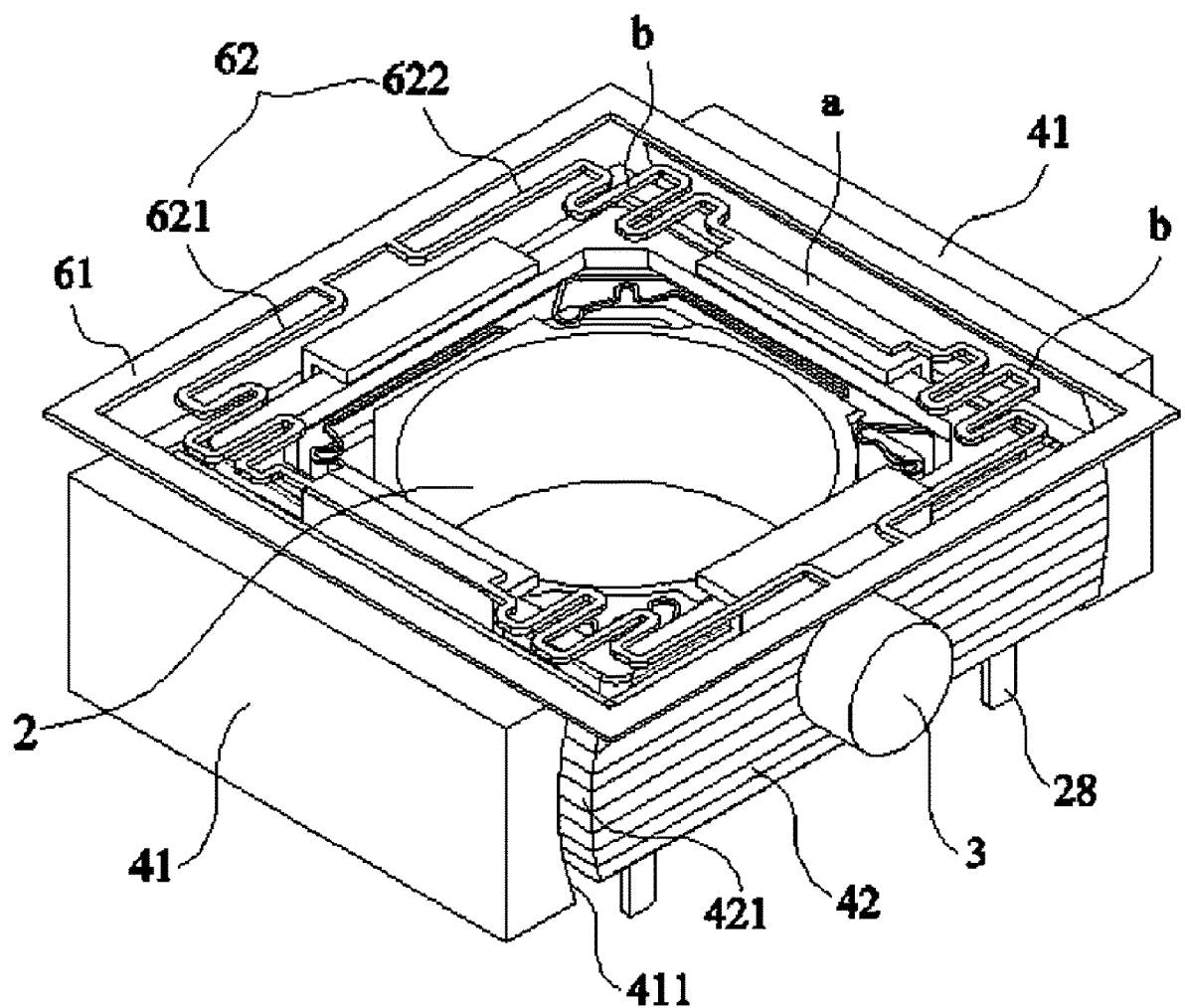
FIG. 3 is a schematic view of FIG. 1 when the fixing member is removed.

Referring to FIG. 3, in an embodiment of this disclosure, the camera module comprises two first magnetic members 41, and the two first magnetic members 41 are located on respective sides of an extension direction of the connection shaft 3, and the first conductive member 42 is arranged in the magnetic field of each first magnetic member 41 so as to generate, when the first conductive member 42 is energized, driving forces for the photographing unit in opposite directions in the magnetic fields of the two first magnetic members 41, respectively. Therefore, in FIG. 3, the two first magnetic members 41 are arranged such that their ends close to the first conductive member 42 have opposite polarities, and thus portions of the photographing unit 2 on both sides of the connection shaft 3 can receive the driving force that drives the photographing unit 2 to rotate around the connection shaft 3, which improves the driving effect for the photographing unit 2.

Specifically, if the first conductive member 42 is fixed to the photographing unit 2, the driving force is an Ampere force received by the first conductive member 42 in the magnetic field; in case the first magnetic member 41 is fixed to the photographing unit 2, the driving force is a reaction force of the Ampere force received by the first magnetic member 41 in the magnetic field.

The ampere force received by the energized first conductive member 42 in the magnetic field can be represented as the following equation: $F=BIL$, in which B is the magnetic induction, I is the magnitude of the energizing current, and L is the length of the first conductive member 42. Therefore, the longer the length L of the first conductive member 42 is, the greater the ampere force F received by the first conductive member 42 in the magnetic field is, and the greater the reaction force of the ampere force F received by the first magnetic member 41 in the magnetic field is. The shorter the length L of the first conductive member 42 is, the smaller the ampere force F received by the first conductive member 42 in the magnetic field is, and the smaller the reaction force of the ampere force F received by the first magnetic member 41 in the magnetic field is.

Figure 2:
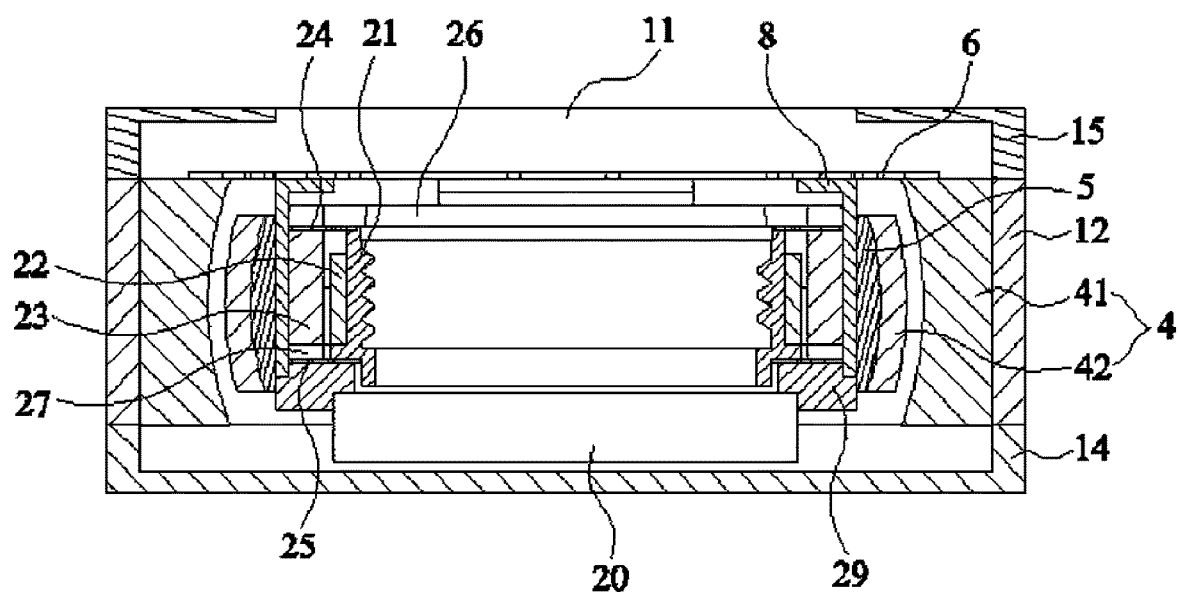
FIG. 2 is a sectional view of FIG. 1 along direction A-A.

In the above embodiments, the first conductive member 42 can be either a wire or a coil. When the first conductive member 42 is a wire, the length L of the first conductive member 42 is relatively shorter, and the ampere force F received by the first conductive member 42 in the magnetic field is correspondingly small, and the reaction force of the ampere force F received by the first magnetic member 41 in the magnetic field is correspondingly small, so the driving effect for the photographing unit 2 is poorer. In case the first conductive member 42 is a coil, the length L of the first conductive member 42 is longer, and the ampere force F received by the first conductive member 42 in the magnetic field is correspondingly greater, and the reaction force of the ampere force F received by the first magnetic member 41 in the magnetic field is correspondingly greater, so a better driving effect for the photographing unit 2 can be achieved. Therefore, in certain exemplary embodiments of this disclosure, the first conductive member 42 is a coil, which increases the ampere force received by the first conductive member 42 in the magnetic field and the reaction force of the ampere force received by the first magnetic member 41 in the magnetic field, i.e., the driving force for the photographing unit 2 is increased, and thus the driving effect for the photographing unit 2 is ensured. Besides, in certain exemplary embodiments, multi-turn coils are arranged to surround the photographing unit 2 as shown in FIG. 2 and FIG. 3. The coil has a light weight, so the photographing unit 2 can rotate more smoothly.

Figure 6:
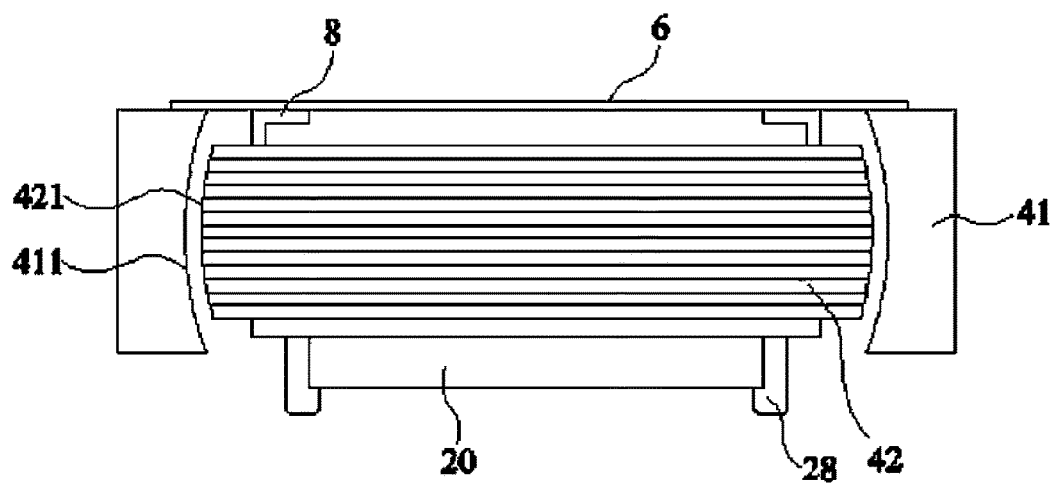
FIG. 6 is a schematic view of the first cambered surface and the second cambered surface in the camera module according to an embodiment of this disclosure.

In order to prevent interference between the coil and the first magnetic member 41 during the rotation of the photographing unit 2, and meanwhile avoid an increased size of the camera module, as shown in FIG. 3 and FIG. 6, in an embodiment of this disclosure, a portion of the multi-turn coils corresponding to the first magnetic member 41 forms a first cambered surface 421 protruding outwardly, a surface of the first magnetic member 41 facing the coils is a second cambered surface 411, and a center of the second cambered surface 411 coincides with that of the first cambered surface 421, and the center is located on an axis of the connection shaft 3, and a gap is left between the second cambered surface 411 and the first cambered surface 421. As a result, during the rotation of the photographing unit 2 around the connection shaft 3, the width of the gap between the second cambered surface 411 and the first cambered surface 421 remains constant, which can prevent interference between the coils and the first magnetic member 41 without increasing the distance between the first magnetic member 41 and the coils, thereby avoiding the problem of an increased size of the camera module. In this case, the direction of the driving force is tangent to the first cambered surface 421.

Figure 4:
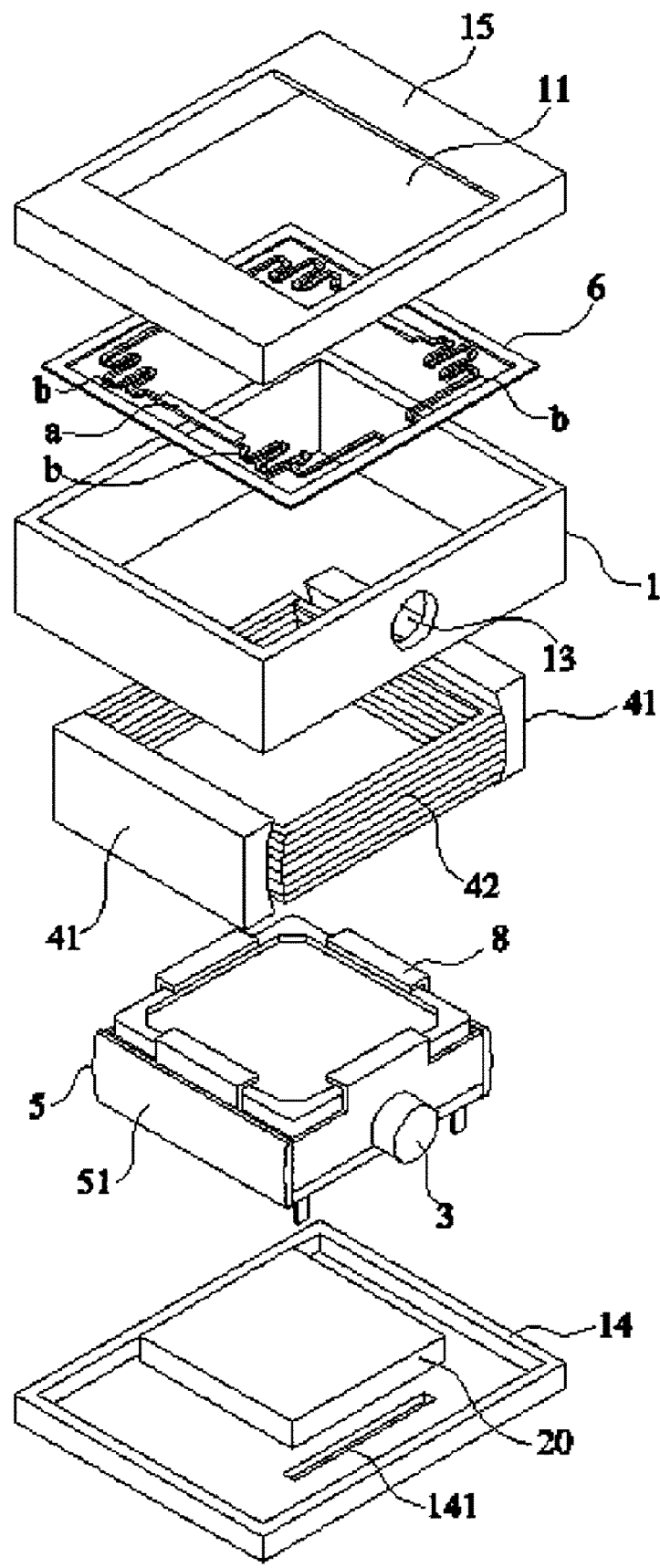
FIG. 4 is a partial schematic exploded view of FIG. 1.

In order to enable the portion of the multi-turn coils corresponding to the first magnetic member 41 to form the first cambered surface 421 protruding outwardly, the coils in the middle can be wound loosely, and coils on both ends can be wound tightly, in this way, the portion of the multi-turn coils corresponding to the first magnetic member 41 can form the first cambered surface 421. However, this requires accurately controlling the tightness in different positions during the winding, and thus increases the difficulty of process during the winding. Referring to FIG. 2 and FIG. 4, in an embodiment of this disclosure, the camera module comprises a support member 5 for at least supporting the portion of the multi-turn coils corresponding to the first magnetic member, the support member 5 corresponding to the first magnetic member 41 in position, and a surface of the support member 5 contacting the coils is a third cambered surface 51 protruding outwardly, a center of the third cambered surface 51 coincides with that of the second cambered surface 411. Thereby, the wire can be evenly wound around the photographing unit 2 and the support member 5 during winding, and now the portion of the multi-turn coils corresponding to the first magnetic member 41 can be supported by the third cambered surface 51, thereby forming the first cambered surface 421. In this way, the tightness of the coils can be substantially consistent in different positions during the winding, i.e., it does not require accurately controlling the tightness in different positions and thus decreases the difficulty of process during the winding.

Referring to FIG. 2, FIG. 4 to FIG. 6, the photographing unit 2 comprises a first base 29 for fixing an imaging sensor 20 and a bracket 21 for supporting a lens assembly (not shown), the bracket 21 being connected with the first base 29 via a first elastic member 25, and the photographing unit further comprises a second magnetic member above the first base and a second conductive member 22 attached to the bracket 21, the second conductive member 22 being arranged to be located in the magnetic field of the second magnetic member 23 such that, when the second conductive member 22 is energized, a driving force generated for the second conductive member 22 can overcome an elastic force from the first elastic member 25, thereby driving the bracket 21 to move in a direction toward or away from the first base 29, adjusting the distance between the lens assembly and the imaging sensor 20, and thus achieving focusing. The second magnetic member 23 is connected with a first yoke 8, and the coils are arranged to surround the first yoke 8. The first yoke 8 can concentrate magnetic induction lines of the second magnetic member 23 around the second conductive member 22 and meanwhile concentrate magnetic induction lines of the first magnetic member 41 around the first conductive member 42, i.e., the photographing unit 2 and the driving component 4 can share the first yoke 8 such that the magnetic energy of the first magnetic member 41 and the second magnetic member 23 can be sufficiently utilized and thus the efficiency of the first magnetic member 41 and the second magnetic member 23 can be improved. Besides, the first yoke 8 can further separate the magnetic field of the first magnetic member 41 from that of the second magnetic member 23, thereby avoiding interference between the magnetic fields of the first magnetic member 41 and the second magnetic member 23, and hence achieving better focusing effect and rotation effect of the photographing unit 2.

Further, referring to FIG. 2 and FIG. 3, the camera module further comprises a second elastic member 6 for connecting the first yoke 8 with the first magnetic member 41 or the fixing member 1. In this way, when the first conductive member 42 is energized, a driving force capable of driving the photographing unit 2 to rotate around the connection shaft 3 can be generated in the magnetic field of the first magnetic member 41, so the photographing unit 2 can rotate around the connection shaft 3, thereby pulling an end of the second elastic member 6 connected with the first yoke 8 such that the second elastic member 6 deforms to generate an elastic force. The elastic force can gradually increase as the photographing unit 2 rotates. When the elastic force is equal to the driving force, the photographing unit 2 stops rotating. Therefore, the second elastic member 6 can accurately restrict the rotation of the photographing unit 2 such that the magnitude of the view angle of the photographing unit 2 is more accurate. Besides, for the camera module in this embodiment, the energizing current for the first conductive member 42 may be slightly adjusted, so that the driving force that drives the photographing unit 2 to rotate varies slightly, thus enabling the magnitude of the driving force to be more accurate, in turn the position in which the photographing unit 2 stops is more accurate, and the magnitude of the view angle of the photographing unit 2 can be controlled more accurately.

Since edges of the photographing unit 2 at opposite sides with respect to a geometric center thereof have equal distances to the geometric center, in certain exemplary embodiments of this disclosure, the axis of the connection shaft 3 passes through the geometric center of the photographing unit 2, and thus the edges of the photographing unit 2 at opposite sides with respect to the connection shaft 3 have equal distances to the connection shaft 3. In this case, when the photographing unit 2 rotates around the connection shaft 3, the edges of the photographing unit 2 located on opposite sides of the connection shaft 3 have equal swing amplitudes, so the two first magnetic members 41 arranged on respective sides in the extension direction of the connection shaft 3 can have the same sizes, avoiding either of them being too large and thus reducing the volume of the camera module.

In certain exemplary embodiments, the second elastic member 6 is a voice coil motor spring piece, as shown in FIG. 2 to FIG. 4, the voice coil motor spring piece comprises an outer ring 61 and an inner ring 62, the outer ring 61 being connected with the first elastic member 41 or the fixing member 1, the inner ring 62 comprising a first spring wire segment 621 and a second spring wire segment 622 connected with the first yoke 8, and the first spring wire segment 621 and the second spring wire segment 622 are mirror structures, i.e., they are symmetrical with respect to the connection shaft 3, and each of the first spring wire segment 621 and the second spring wire segment 622 is both connected with the outer ring 61 at both ends thereof. For the first spring wire segment 621 or the second spring wire segment 622, one end thereof is close to the connection shaft 3, and the other end is remote from the connection shaft 3. The first spring wire segment 621 and the second spring wire segment 622 are connected with the first yoke 8, which can increase the connection area of the second elastic member 6 and the first yoke 8 such that the force applied to the photographing unit 2 is more stable and thus the position in which the photographing unit 2 stops can be more accurate.

Figure 5:
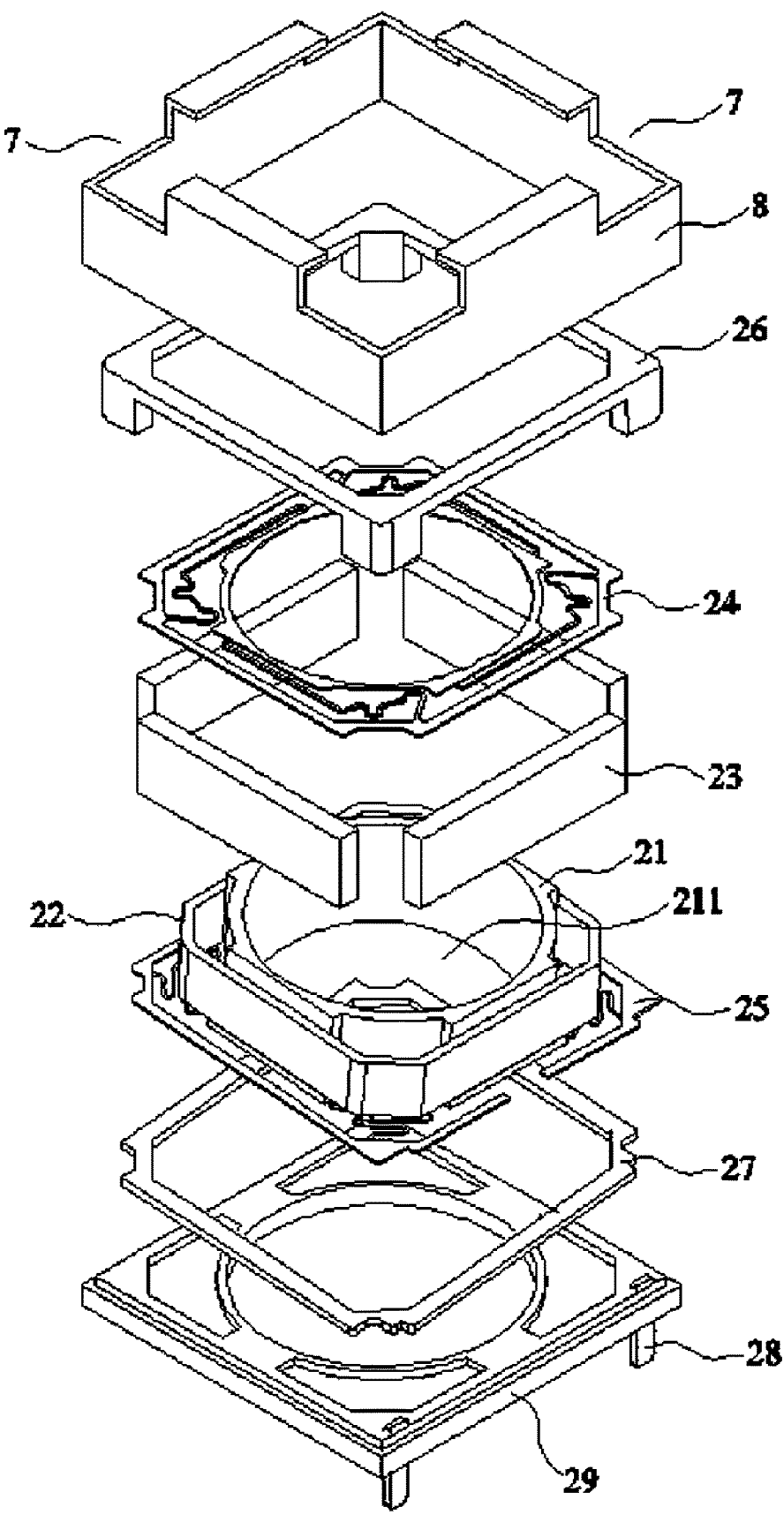
FIG. 5 is a partial schematic exploded view of the photographing unit in the camera module according to an embodiment of this disclosure.

Referring to FIG. 3 to FIG. 5, the first spring wire segment 621 and the second spring wire segment 622 both comprise a central region a and two end regions b, the central region a being connected with the first yoke 8. Specifically, the central region a is connected with a position of the first yoke 8 close to the first magnetic member 41, and the first yoke 8 is provided with escape grooves 7 at positions corresponding to the end regions b. That is, the first yoke 8 is provided with four escape grooves 7, and the four escape grooves 7 correspond to four corners of the first yoke 8, respectively, thereby preventing the four end regions b of the first spring wire segment 621 and the second spring wire segment 622 having smaller deformation amplitudes from impeding the rotation of the photographing unit 2, and thus making the rotation of the photographing unit 2 smoother.

Specifically, referring to FIG. 1 and FIG. 2, in certain exemplary embodiments, the fixing member 1 is a housing provided with an opening 11, and the photographing unit 2 and the driving component 4 are both located inside the housing, and an optical path of the photographing unit 2 passes through the opening 11. Thereby, the integrity of the camera module is improved.

In another embodiment, the housing comprises a second yoke 12, and the first magnetic member 41 is fixed to the second yoke 12. The second yoke 12 can concentrate magnetic induction lines of the first magnetic member 41 around the first conductive member 42, such that the magnetic energy of the first magnetic member 41 can be sufficiently utilized and thus the efficiency of the first magnetic member 41 can be improved. In this case, a connection hole 13 can be arranged in the second yoke 12, with which the photographing unit 2 is connected via the connection shaft 3.

Referring to FIG. 1, FIG. 2 and FIG. 4, the housing further comprises an upper cover 15 and a second base 14 connected with the second yoke 12, the opening 11 is provided in the upper cover 15. Thereby, the photographing unit 2 and the driving component 4 can be mounted before the upper cover 15 is mounted, which avoids impeding the mounting of the photographing unit 2 and the driving component 4 and facilitates the mounting of the photographing unit 2 and the driving component 4, and meanwhile prevents the volume of the second yoke 12 from being too large and reduces the cost of the housing. In addition, in order to facilitate wiring, the second base 14 is provided with a square hole 141 for wiring.

A specific example is provided below for illustrating the embodiments of this disclosure in detail. Referring to FIG. 1 to FIG. 8, the photographing unit 2 of the camera module in this embodiment comprises a bracket 21 in which a through hole 211 is provided. A lens assembly (not shown) is provided inside the through hole 211. The lens assembly is connected with the through hole 211 via screw threads, and the coil 22 are wound around the bracket 21. In the example of FIG. 2, current directions in the coils 22 on respective sides of the bracket 21 are opposite, the current direction on one side goes into the paper vertically, and the current direction on the other side comes out of the paper vertically. On the periphery of the coils 22, four magnets 23 can be provided. The ends of the four magnets 23 close to the coils 22 have the same polarity. The outer ring of the voice coil motor spring piece 24 is connected with the magnets 23, and the inner ring of the voice coil motor spring piece 24 is connected with the bracket 21. The voice coil motor spring piece 24 is further connected with a first gasket 26. The voice coil motor spring piece 25 is made of a conductive material, comprising two portions for connecting the two ends of the coil 22 with two electrodes 28, respectively. The electrodes 28 penetrate through an aperture (not shown) in the first base 29, and a second gasket 27 is used for separating the voice coil motor spring piece 25 from the magnets 23. On the first base 29 an imaging sensor 20 is fixed. The imaging sensor 20 can be a CMOS (complementary metal oxide semiconductor) imaging sensor or a CCD (charge-coupled device) imaging sensor. When the coil 22 is energized, the driving force generated on the coil 22 can overcome the elastic force of the voice coil motor spring piece 24 and the voice coil motor spring piece 25, thereby driving the bracket 21 to move toward or away from the first base 29, and adjusting the distance between the lens assembly and the imaging sensor 20, and thus achieving focusing.

A first yoke 8 is sleeved outside the four magnets 23. A connection shaft 3 and two support members 5 are fixed to an outer surface of the first yoke 8. An axis of the connection shaft 3 passes through a geometric center of the photographing unit 2, and the two support members 5 are arranged symmetrically with respect to the connection shaft 3. The support member 5 comprises a third cambered surface 51. The coil 42 is sleeved on the third cambered surface 51 and the first yoke 8, and the coil 42 is arranged to avoid impeding the optical path of the photographing unit 2. The first yoke 8 can concentrate magnetic induction lines of the magnet 23 around the coil 22 and meanwhile concentrate magnetic induction lines of the magnet 41 around the coil 42, i.e., the photographing unit 2 and the driving component 4 can share the first yoke 8 such that the magnetic energy of the magnet 41 and the magnet 23 can be sufficiently utilized and thus the efficiency of the magnet 41 and the magnet 23 can be improved. Besides, the first yoke 8 can further separate the magnetic field of the magnet 41 from that of the magnet 23, thereby avoiding interference between the magnetic fields of the magnet 41 and the magnet 23, and hence achieving better focusing effect and rotation effect of the photographing unit 2. In FIG. 2, the current directions in the coils 42 on respective sides of the support member 5 are opposite, the current direction on one side goes into the paper vertically, and the current direction on the other side comes out of the paper vertically. With the third cambered surface 51, the coils 42 wound around the support member 5 can form the first cambered surface 421. The magnet 41 is provided outside the coils 42 in a position corresponding to the first cambered surface 421. The ends of the two magnets 41 close to the coil 42 have opposite polarities. For example, referring to FIG. 2, when the end of the magnet 41 close to the coil 42 on the left is an N pole, the end of the magnet 41 close to the coil 42 on the right is an S pole. When the end of the magnet 41 close to the coil 42 on the left is an S pole, the end of the magnet 41 close to the coil 42 on the right is an N pole. Therefore, when the coil 42 is energized, a driving force capable of driving the photographing unit 2 to rotate around the connection shaft 3 can be generated in the magnetic field of the magnet 41. With the rotation of the photographing unit 2 around the connection shaft 3, the optical path of the photographing unit 2 can be deflected. That is, the lens assembly can be deflected, which increases the view angle of the camera module. A surface of the magnet 41 facing the first cambered surface 421 is a second cambered surface 411, and a center of the second cambered surface 411 coincides with that of the first cambered surface 421, and the center is located on an axis of the connection shaft 3, and a gap is left between the second cambered surface 411 and the first cambered surface 421. As a result, during the rotation of the photographing unit 2 around the connection shaft 3, the width of the gap between the second cambered surface 411 and the first cambered surface 421 remains constant, which can prevent interference between the coil 42 and the magnet 41 without increasing the distance between the magnet 41 and the coil 42, thereby avoiding the problem of an increased size of the camera module. A voice coil motor spring piece 6 connects the magnet 41 with the first yoke 8. Specifically, an outer ring 61 of the voice coil motor spring piece 6 is connected with the magnet 41. An inner ring 62 of the voice coil motor spring piece 6 comprises a first spring wire segment 621 and a second spring wire segment 622 connected with the first yoke 8, the first spring wire segment 621 and the second spring wire segment 622 are mirror structures, i.e., they are symmetrical with respect to the connection shaft 3, and each of the first spring wire segment 621 and the second spring wire segment 622 is connected with the outer ring 61 at both ends thereof. For the first spring wire segment 621 or the second spring wire segment 622, one end thereof is close to the connection shaft 3, and the other end is remote from the connection shaft 3. The first spring wire segment 621 and the second spring wire segment 622 both comprise a central region a and two end regions b, the central region a being connected with the first yoke 8. Specifically, the central region a is connected with a position of the first yoke 8 close to the first magnetic member 41, and the first yoke 8 is provided with escape grooves 7 in positions corresponding to the end regions b. That is, the first yoke 8 is provided with four escape grooves 7, and the four escape grooves 7 correspond to four corners of the first yoke 8, respectively, thereby preventing the four end regions b of the first spring wire segment 621 and the second spring wire segment 622 having smaller deformation amplitudes from impeding the rotation of the photographing unit 2, and thus making the rotation of the photographing unit 2 smoother.

A second yoke 12 is sleeved outside the magnet 41, and a connection hole 13 is provided in the second yoke 12, with which the connection shaft 3 is connected. The second yoke 12 is connected with an upper cover 15 and a second base 14 on respective sides. An opening 11 is provided in the upper cover 15, through which the optical path of the photographing unit 2 passes. A square hole 141 for wiring is provided in the second base 14.

An embodiment of this disclosure further provides an electronic device, comprising the camera module according to any of the above embodiments.

For the electronic device provided in the embodiment of this disclosure, the photographing unit 2 in the camera module is connected with the fixing member 1 via a connection shaft 3, and the driving component 4 comprises a first magnetic member 41 and a first conductive member 42, either of the first magnetic member 41 and the first conductive member 42 being fixed to the photographing unit 2, and the other being fixed to the fixing member 1, and the first conductive member 42 is located in the magnetic field of the first magnetic member 41, so when the first conductive member 42 is energized, a driving force capable of driving the photographing unit 2 to rotate around the connection shaft 3 can be generated in the magnetic field of the first magnetic member 41. With the rotation of the photographing unit 2 around the connection shaft 3, the optical path of the photographing unit 2 can be deflected, i.e., the lens assembly can be deflected, which increases the view angle of the camera module.

Further, for the electronic device provided in the embodiment of this disclosure, the photographing unit 2 can be directly driven to rotate around the connection shaft 3 with a driving force generated in the magnetic field of the first magnetic member 41 and acting on the first conductive member 42 or the first magnetic member 41, so no transmission mechanisms are required, which avoids the problem of a large volume of the camera module due to certain space occupied by the transmission mechanisms, and meanwhile avoids the problem of high power consumption and low location accuracy of the camera module caused by frictions of the transmission mechanisms during the transmission and low transmission accuracy thereof.

Furthermore, the electronic device in this embodiment further comprises a controller (not shown), the controller being connected with the first conductive member 42 and the photographing unit 2, respectively, and configured for controlling a current flowing through the first conductive member 42 and controlling ON and OFF of the photographing unit 2, thereby achieving automatic control.

Figure 7:
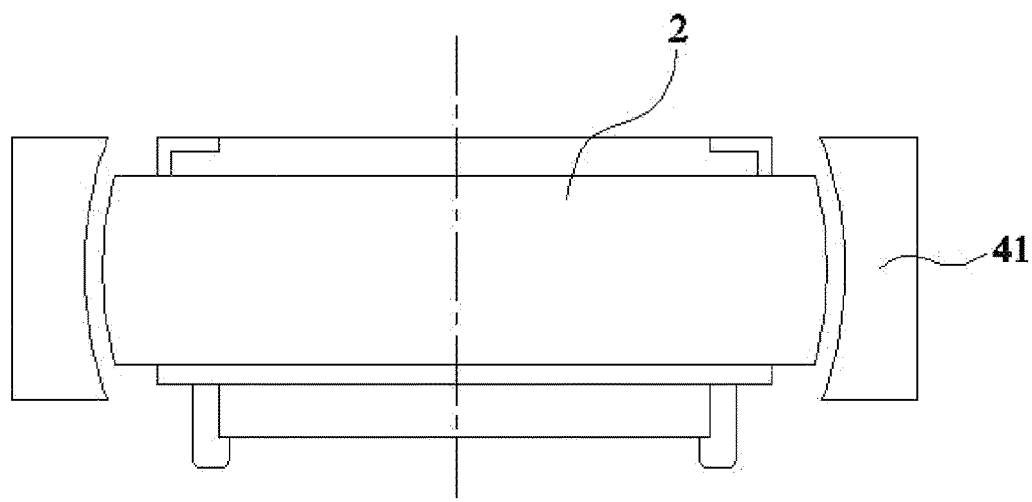
FIG. 7 is a schematic view of the photographing unit in the camera module before rotation according to an embodiment of this disclosure.
Figure 8:
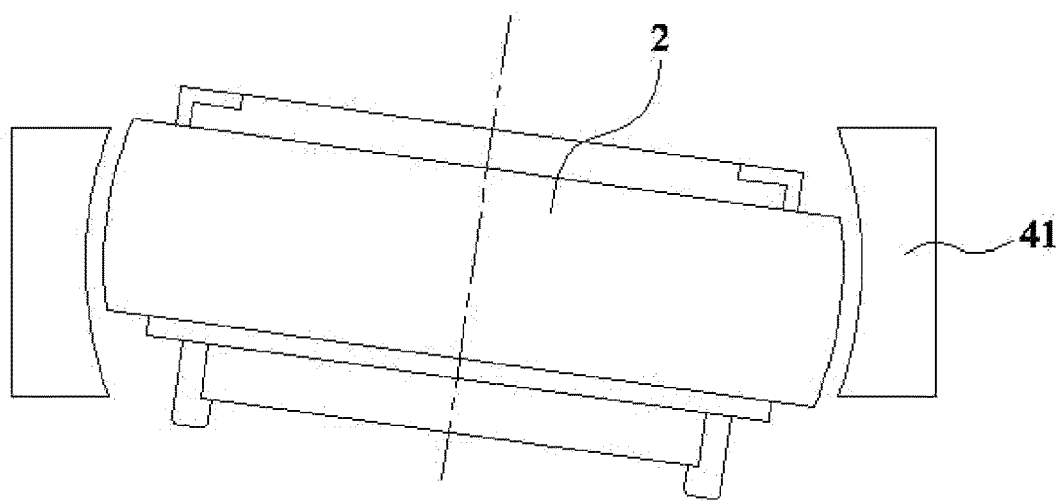
FIG. 8 is a schematic view of the photographing unit in the camera module after rotation according to an embodiment of this disclosure.

Referring to FIG. 2, FIG. 7 and FIG. 8, FIG. 7 is a schematic view of the photographing unit 2 before rotation, and FIG. 8 is a schematic view of the photographing unit 2 after rotation.

Another embodiment of this disclosure provides a method for photographing with the above electronic device, comprising steps as follows. The controller receives a wide view angle photographing signal, and controls the first conductive member 42 to be supplied with a current in a first direction so as to generate in the magnetic field of the first magnetic member 41 a driving force capable of driving the photographing unit 2 to rotate around the connection shaft 3 in a third direction, so the photographing unit 2 can rotate around the connection axis 3 in the third direction. When the photographing unit 2 rotates in the third direction to a first position, the controller controls the photographing unit 2 to be switched on and controls the first conductive member 42 to be supplied with current in a second direction opposite to the first direction, so as to generate in the magnetic field of the first magnetic member 41 a driving force capable of driving the photographing unit 2 to rotate around the connection shaft 3 in a fourth direction, the fourth direction being opposite to the third direction, and thereby the photographing unit 2 can perform photographing while rotating around the connection axis 3. When the photographing unit 2 rotates in the fourth direction to a second position, the controller controls the photographing unit 2 to be switched off and stop photographing, and controls the first conductive member 42 to be supplied with the current in the first direction, so as to generate in the magnetic field of the first magnetic member 41 a driving force capable of driving the photographing unit 2 to rotate around the connection shaft 3 in the third direction, so the photographing unit 2 can rotate around the connection axis 3 in the third direction. When the photographing unit 2 rotates in the third direction to the original position, the controller controls the first conductive member 42 to be deenergized such that the photographing unit 2 stops rotating, and so far the wide view angle photographing is accomplished. As can be understood from above, the "first position" and the "second position" mentioned herein refer to limit positions at which the photographing unit 2 can arrive in the third direction and the fourth direction, the limit positions depend on the wide view angle photographing signal received by the controller. Moreover, the angle across which the photographing unit 2 rotates between the first position and the second position corresponds to the wide view angle required by the wide view angle photographing signal.

A further embodiment of this disclosure provides a method for photographing with the above electronic device, the electronic device further comprising a second elastic member 6 and the second elastic member 6 connecting the photographing unit 2 with the first magnetic member 41 or the fixing member 1. The method comprises steps as follows. The controller receives a wide view angle photographing signal, and controls the first conductive member 42 to be supplied with a current in a first direction so as to generate in the magnetic field of the first magnetic member 41 a first driving force capable of driving the photographing unit 2 to rotate around the connection shaft 3 in a third direction, so the photographing unit 2 can rotate around the connection axis 3 in the third direction. The rotation of the photographing unit 2 in the third direction pulls an end of the second elastic member 6 connected with the photographing unit 2 such that the second elastic member 6 deforms to generate an elastic force. As the photographing unit 2 rotates in the third direction, the elastic force can gradually increase. When the elastic force is equal to the first driving force, the controller controls the photographing unit 2 to be switched on and start photographing, and controls the current in the first direction to gradually decrease such that the second elastic member 6 gradually restores to its original shape, so the photographing unit 2 can rotate around the connection shaft 3 in a direction opposite to the third direction. When the second elastic member 6 restores to the original shape, the controller controls the first conductive member 42 to be supplied with a current in a second direction opposite to the first direction current so as to generate in the magnetic field of the first magnetic member 41 a second driving force capable of driving the photographing unit 2 to rotate around the connection shaft 3 in a fourth direction, the fourth direction being opposite to the third direction, so the photographing unit 2 can rotate around the connection shaft in the fourth direction. The rotation of the photographing unit 2 in the fourth direction pulls the end of the second elastic member 6 connected with the photographing unit 2 such that the second elastic member 6 deforms to generate an elastic force. As the photographing unit 2 rotates in the fourth direction, the elastic force can gradually increase. When the elastic force is equal to the second driving force, the controller controls the photographing unit 2 to be switched off to stop photographing, and controls the first conductive member 42 to be deenergized. Under the effect of the elastic force, the photographing unit 2 can rotate around the connection axis 3 in the third direction to the original position. So far, the wide view angle photographing is accomplished.

What have been described above are only specific embodiments of this disclosure, but the protection scope of the present invention shall not be limited thereto. Any variation or substitution easily conceivable within the technical field disclosed in this disclosure for a skilled person who is familiar with this technical field shall fall within the scope of the invention. Therefore, the scope of the invention shall be subject to the scope of the appended claims.

The invention claimed is:
1. A camera module, comprising:
a fixing member;
a photographing unit connected with the fixing member via a connection shaft; and
a driving component comprising a first magnetic member and a first conductive member, either of the first magnetic member and the first conductive member being fixed to the photographing unit, and the other being fixed to the fixing member;
wherein the first conductive member is arranged to be located in a magnetic field of the first magnetic member, so as to generate, in response to reception of electric power by the first conductive member, a driving force capable of driving the photographing unit to rotate around the connection shaft in the magnetic field of the first magnetic member; and
wherein the fixing member is a housing with an opening, wherein the photographing unit and the driving component are both located inside the housing, and an optical path of the photographing unit passes through the opening, wherein the housing comprises a second yoke, and the first magnetic member is fixed to the second yoke.

2. The camera module according to claim 1, wherein the camera module comprises two first magnetic members, and the two first magnetic members are located on respective sides of an extension direction of the connection shaft, and the first conductive member is arranged in the magnetic field of each first magnetic member so as to generate, in response to reception of electric power by the first conductive member, driving forces for driving the photographing unit in opposite directions in the magnetic fields of the two first magnetic members, respectively.

3. The camera module according to claim 1, wherein the photographing unit comprises a first base for fixing an imaging sensor and a bracket for supporting a lens assembly, the bracket being connected with the first base via a first elastic member, and the photographing unit further comprises a second magnetic member above the first base and a second conductive member attached to the bracket, wherein the second conductive member is arranged to be located in the magnetic field of the second magnetic member such that the second conductive member generates, in response to reception of electric power by the second conductive member, a driving force capable of driving the bracket to move in a direction toward or away from the first base; wherein the second magnetic member is connected with a first yoke, and the coils surround the first yoke.

4. The camera module according to claim 3, wherein the camera module further comprises a second elastic member, the second elastic member is used for connecting the first yoke with the first magnetic member or the fixing member.

5. The camera module according to claim 4, wherein the axis of the connection shaft passes through a geometric center of the photographing unit.

6. The camera module according to claim 5, wherein the second elastic member is a voice coil motor spring piece, the voice coil motor spring piece comprising an outer ring and an inner ring, the outer ring being connected with the first elastic member or the fixing member, the inner ring comprising a first spring wire segment and a second spring wire segment connected with the first yoke, wherein the first spring wire segment and the second spring wire segment are symmetrical with respect to the connection shaft, and each of the first spring wire segment and the second spring wire segment is connected with the outer ring at both ends thereof.

7. The camera module according to claim 6, wherein the first spring wire segment and the second spring wire segment both comprise a central region and end regions, the central region being connected with the first yoke, and the first yoke is provided with escape grooves in positions corresponding to the end regions.

8. The camera module according to claim 1, wherein the housing further comprises an upper cover and a second base connected with the second yoke, the opening is provided in the upper cover.

9. The camera module according to claim 1, wherein the connection shaft is a hinge shaft, and the photographing unit is hinged to the fixing member.

10. An electronic device comprising the camera module according to claim 1.

11. The electronic device according to claim 10, wherein the electronic device further comprises a controller connected with the first conductive member and the photographing unit, respectively, and the controller is configured for controlling a current flowing through the first conductive member and controlling the photographing unit to be switched on and off.

12. A method for photographing with the electronic device according to claim 11, comprising:
by means of the controller, receiving a wide view angle photographing signal, and controlling the first conductive member to be supplied with a current in a first direction so as to generate in the magnetic field of the first magnetic member a driving force capable of driving the photographing unit to rotate around the connection shaft in a third direction;
controlling the photographing unit to be switched on and controlling the first conductive member to be supplied with a current in a second direction opposite to the first direction by the controller when the photographing unit rotates in the third direction to a first position, so as to generate in the magnetic field of the first magnetic member a driving force capable of driving the photographing unit to rotate around the connection shaft in a fourth direction, the fourth direction being opposite to the third direction;
controlling the photographing unit to be switched off and controlling the first conductive member to be supplied with the current in the first direction by the controller when the photographing unit rotates in the fourth direction to a second position, so as to generate in the magnetic field of the first magnetic member the driving force capable of driving the photographing unit to rotate around the connection shaft in the third direction;
controlling the first conductive member to be deenergized by the controller when the photographing unit rotates in the third direction to an original position.

13. A method for photographing with an electronic device, the electronic device comprising the camera module according to claim 4, the method comprising:
receiving a wide view angle photographing signal and controlling the first conductive member to be supplied with a current in a first direction by a controller so as to generate in the magnetic field of the first magnetic member a first driving force capable of driving the photographing unit to rotate around the connection shaft in a third direction, wherein the rotation of the photographing unit in the third direction pulls an end of the second elastic member connected with the photographing unit such that the second elastic member deforms to generate an elastic force,
controlling the photographing unit to be switched on and controlling the current in the first direction to gradually decrease by the controller when the elastic force is equal to the first driving force, such that the second elastic member gradually restores to an original shape,
controlling by the controller the first conductive member to be supplied with a current in a second direction opposite to the first direction current when the second elastic member restores to the original shape, so as to generate in the magnetic field of the first magnetic member a second driving force capable of driving the photographing unit to rotate around the connection shaft in a fourth direction, the fourth direction being opposite to the third direction, wherein the rotation of the photographing unit in the fourth direction pulls an end of the second elastic member connected with the photographing unit such that the second elastic member deforms to generate an elastic force,
controlling the photographing unit to be switched off and controlling the first conductive member to be deenergized by the controller when the elastic force is equal to the second driving force.

14. The method according to claim 13, wherein the method further comprises a step of providing electric power to the second conductive member such that the second conductive member generates a driving force for driving the bracket to move in a direction toward or away from the first base.

15. The camera module according to claim 2, wherein the fixing member is a housing provided with an opening, wherein the photographing unit and the driving component are both located inside the housing, and an optical path of the photographing unit passes through the opening.

16. The camera module according to claim 1, wherein:
the first conductive member comprises multi-turn coils surrounding the photographing unit, respective turns of coils of the multi-turn coils are vertically stacked on top of each other to form a first cambered surface protruding outwardly;
the first magnetic member comprises a second cambered surface facing the first cambered surface, a center of the second cambered surface coincides with a center of the first cambered surface, the center of the second cambered surface is located on an axis of the connection shaft, and wherein a gap is left between the second cambered surface and the first cambered surface; and
the camera module comprises a support member for at least supporting the portion of the multi-turn coils corresponding to the first magnetic member, and a surface of the support member contacting the multi-turn coils is a third cambered surface protruding outwardly, and a center of the third cambered surface coincides with a center of the second cambered surface.

* * * * *